(12) United States Patent
Baazi et al.

(10) Patent No.: US 12,360,505 B2
(45) Date of Patent: *Jul. 15, 2025

(54) MONITORING LAUNDRY MACHINE OPERATION USING MACHINE LEARNING ANALYSIS OF ACOUSTIC TRANSDUCER SIGNAL INFORMATION

(71) Applicant: Alliance Laundry Systems LLC, Ripon, WI (US)

(72) Inventors: Richard Baazi, Weston, FL (US); Mathias Takahashi Albert, Chicago, IL (US); Dattaprabodh Narhar Godbole, Plymouth, MN (US); John Boyle, Tempe, AZ (US); Joseph Weedon Hainline, III, Kirkwood, MO (US); Nilesh Jayantilal Nahar, Rotterdam (NL); Stephane Serge Jean-Pierre Bodnar, Montaulin (FR); Angie Katherinne Sandoval Lopez, Miami, FL (US); David Vernon Neitzke, Omro, WI (US); Andrew Michael LaPoint, Oshkosh, WI (US); Mitchell Wayne Zastrow, Fond Du Lac, WI (US); Julie Michele Schmidt, Palatine, IL (US); Mark Allen Kovscek, Brownsville, PA (US); Garry Maurice Rosenfeldt, Buffalo Grove, IL (US); Nancy Ann Haring, Glen Ellyn, IL (US)

(73) Assignee: Alliance Laundry Systems LLC, Ripon, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,449

(22) Filed: Sep. 1, 2023

(65) Prior Publication Data

US 2023/0408996 A1     Dec. 21, 2023

Related U.S. Application Data

(63) Continuation of application No. 17/527,444, filed on Nov. 16, 2021, now Pat. No. 11,747,780.

(Continued)

(51) Int. Cl.
*G05B 19/042*     (2006.01)
*G06N 20/00*      (2019.01)

(52) U.S. Cl.
CPC .......... *G05B 19/042* (2013.01); *G06N 20/00* (2019.01); *G05B 2219/2633* (2013.01)

(58) Field of Classification Search
CPC .......... G05B 19/042; G05B 2219/2633; G06N 20/00
See application file for complete search history.

(56) References Cited

U.S. PATENT DOCUMENTS

2011/0000100 A1   1/2011   Malcher et al.
2011/0060553 A1   3/2011   Han et al.
(Continued)

FOREIGN PATENT DOCUMENTS

CN         109491361 A      3/2019

OTHER PUBLICATIONS

European Patent Office, European Search Report in corresponding European Patent Application No. 21895448.5 dated Oct. 24, 2024.

*Primary Examiner* — Michael W Choi
(74) *Attorney, Agent, or Firm* — Leydig, Voit & Mayer, Ltd.

(57) ABSTRACT

A system and method are described for carrying out machine learning-based automated laundry machine error/degraded (Continued)

status detection and maintenance by use of acoustic sensor data rendered by the laundry machines and applied to a plurality of machine learning models for use with acoustic data rendered by the laundry machines.

16 Claims, 5 Drawing Sheets

Related U.S. Application Data

(60) Provisional application No. 63/114,878, filed on Nov. 17, 2020.

(56) References Cited

U.S. PATENT DOCUMENTS

| | | | |
|---|---|---|---|
| 2014/0009300 A1* | 1/2014 | Ha | G05B 23/0205 340/679 |
| 2015/0294553 A1 | 10/2015 | Logan et al. | |
| 2020/0003659 A1 | 1/2020 | Davies et al. | |
| 2020/0034688 A1 | 1/2020 | Lim et al. | |
| 2021/0277564 A1* | 9/2021 | Mashal | D06F 33/34 |
| 2022/0120026 A1* | 4/2022 | Mashal | D06F 34/18 |

* cited by examiner

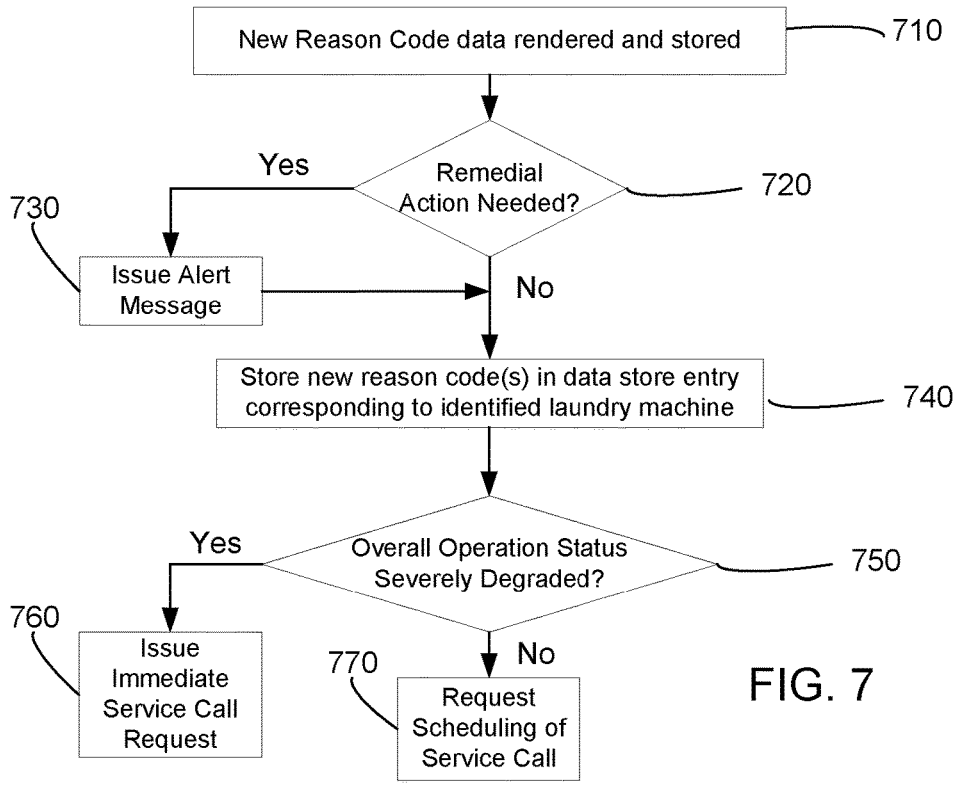
FIG. 7
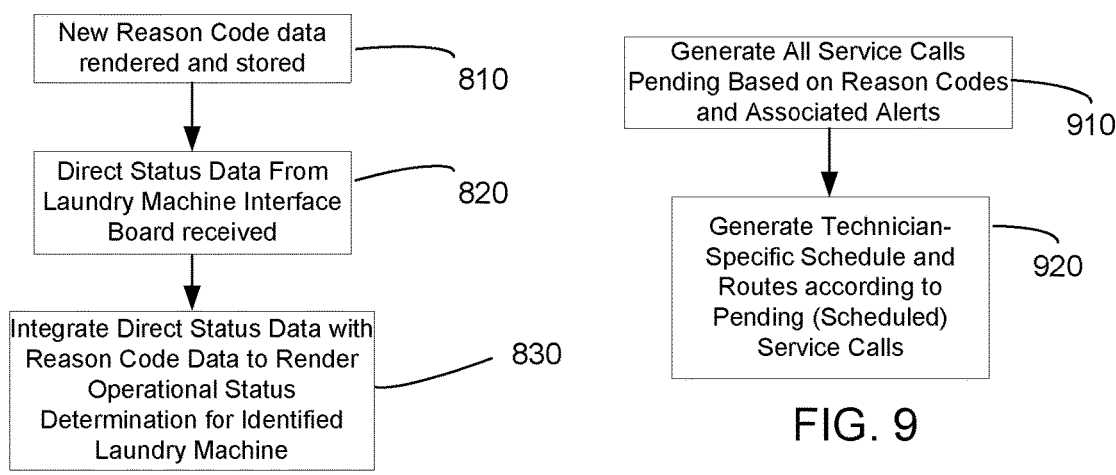
FIG. 8
FIG. 9

MONITORING LAUNDRY MACHINE OPERATION USING MACHINE LEARNING ANALYSIS OF ACOUSTIC TRANSDUCER SIGNAL INFORMATION

CROSS-REFERENCE TO RELATED APPLICATION

This patent application is a continuation application of U.S. application Ser. No. 17/527,444, filed Nov. 16, 2021, entitled "MONITORING LAUNDRY MACHINE OPERATION USING MACHINE LEARNING ANALYSIS OF ACOUSTIC TRANSDUCER SIGNAL INFORMATION," which claims the benefit of U.S. Provisional Application No. 63/114,878, filed on Nov. 17, 2020, entitled "PREDICTIVE OPTIMIZATION OF COMMERCIAL LAUNDRY OPERATIONS," the contents of which are expressly incorporated herein by reference in their entireties, including any references contained therein.

FIELD OF THE TECHNOLOGY

The present disclosure relates generally to laundry machines. More particularly, the disclosure relates to a networked infrastructure for facilitating remote monitoring of laundry machine operational status. Still more particularly, the present disclosure relates to a networked infrastructure, acoustic sensors, and machine learning to monitor laundry machine operational status and diagnose failing operation of such machines.

BACKGROUND

Laundry machines are complex electro-mechanical apparatuses that incorporate a variety of features and functionality. Laundry machines contain interoperating mechanical and electrical components, and the failure of any such component is likely to result in malfunction of the machine. Current laundry machine systems do not reliably detect/diagnose failing/failed components, and thus such machines/systems are unable to provide a warning of an imminent breakdown of components or loss of desired/optimal operation and functionality. Thus, in many cases a failing component is not detected, and the operator of the laundry machine does not become aware of a need to repair the machine until after losing the desired functionality. In the case of such breakdowns, the operator is faced with potentially lengthy periods of downtime until the machine can be serviced and repaired.

SUMMARY OF THE DISCLOSURE

In one aspect, a system is described that includes an acoustic sensor data interface configured to receive digital acoustic signal data corresponding to sensed sound from components of a laundry machine during operation of the laundry machine. The acoustic sensor includes at least a microphone configured to render a transduced electronic signal of sound waves sensed by the microphone during operation of the laundry machine.

The system, in accordance with the disclosure, includes a machine learning-based processing system configured to render a reason code indicative of a current operational status of the laundry machine. The processing system includes a processor and a non-transitory computer readable medium including computer-executable instructions that, when executed by the processor, facilitate carrying out a method including: receiving an acoustic data set rendered from the transduced electronic signal; rendering a functional metric parameter values indicative of an operational status of the laundry machine by applying machine learning models to the acoustic data set; identifying, by applying a set of conditions to a set of predictive maintenance indicators derived from the functional metric parameter values, a reason code corresponding to a degraded operational status of the laundry machine; and issuing, in accordance with the identifying, an electronic maintenance alert relating to a remedial operation for the laundry machine.

In another aspect, a method, carried out by the above-described system, is described.

Further and alternative aspects and features of the disclosed principles will be appreciated from the following detailed description and the accompanying drawings. As will be appreciated, the principles related to systems, methods, and software for apparatuses and operation thereof disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 7 is a flowchart summarizing a set of operations performed in association with carrying out a repair/maintenance task in accordance with a laundry machine status determination rendered by machine learning models in accordance with the disclosure;

FIG. 8 is a flowchart summarizing a set of steps for generating a laundry machine operational status score using a combination of machine interface board data and acoustic sensor data on a machine learning model platform; and FIG. 9 is a flowchart summarizing a route optimization functionality enhanced by the machine learning models in accordance with the disclosure.

DETAILED DESCRIPTION OF THE DRAWINGS

Figure 1:
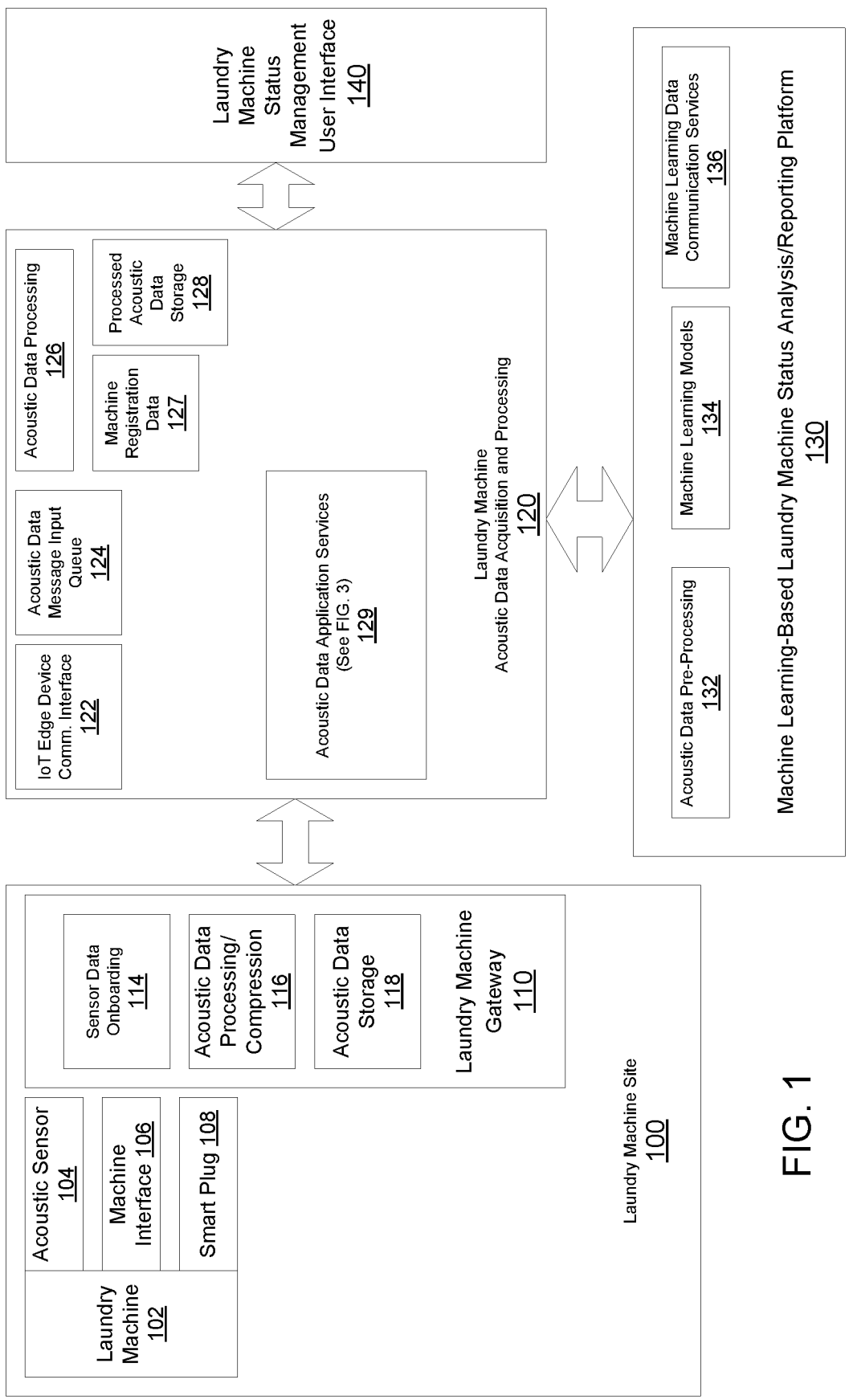
FIG. 1 is a schematic diagram of an exemplary networked system in accordance with the disclosure.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Turning to FIG. 1, a schematic drawing is provided of an exemplary networked system for carrying out remote monitoring of a laundry machine 102 at a laundry machine site 100. In accordance with the disclosure, acoustic data acquired by acoustic sensors (microphones) mounted proximate the laundry machine 102 is processed and applied to a trained machine learning model to render analytical output indicating operational status of the monitored laundry machine 102. Examples of such system are configured to identify actual or potential machine operation failure events and prescribe remedial actions for such detected events. The failure detection is carried out with respect to physical parts of the laundry machine. Examples include motor assembly, drive belt, drum, drain pump, etc. The failure detection is also carried out with respect to various operations of the laundry machine 102. Examples include various operations cycles including: fill, agitate, spin, final extract, etc.

While only a single machine is shown in FIG. 1, in practice multiple instances of the laundry machine 101 are present and incorporated into the system depicted in FIG. 1. The laundry machine 101 is, by way of example, a laundry machine. However, the present disclosure also contemplates combination washing/drying machines.

With continued reference to FIG. 1, an acoustic sensor 104 (e.g. a microphone or any other suitable sound-to-electrical signal transducer) is mounted proximate operational components of the laundry machine 102. Details of the acoustic sensor 104 (including internal and external microphones) are provided in FIG. 2 described herein below. By way of example, the acoustic sensor 104 is an Internet-of-Things (IoT) sensor that incorporates network communications interfaces, one or more microphones, and signal processing components. As such, the acoustic sensor 104 operates to provide basic acoustic sensor data to networked acoustic data processing systems that perform further processing on the basic acoustic sensor data to analyze the data to render laundry machine operational status information for rendering machine status and remedial actions to be taken with respect to the laundry machine 102. Such analysis includes rendering, based upon processing and analysis of the basic acoustic sensor data, notifications of maintenance problems relating to identified component parts and operations of the laundry machine 102.

A machine communication interface 106, for example a printed circuit board, provides a wireless interface through which machine component status information (current and previous) of the laundry machine 102 (e.g., operational information, readings from onboard sensors, and error conditions) are provided to a remote recipient. Additionally, the machine communication interface 106 provides remote control capabilities that include the ability to start, stop, reset, and clear errors on the laundry machine 102.

A smart plug 108 is, for example, an IoT device that is communicatively coupled to receive, from a remotely connected command source (e.g. a mobile phone application) a command to connect and disconnect power to the laundry machine 102.

With continued reference to the illustrative example provided in FIG. 1, a laundry machine gateway 110 communicatively connects the acoustic sensor 104 and the machine interface board 108 to the laundry machine acoustic data acquisition and processing 120 wirelessly (e.g., over 802.11 and/or 802.15.4 protocol to a wireless router providing connectivity to an internet services provide). The gateway 110 includes an acoustic sensor data onboarding component 114 that provides sensor connectivity and onboarding logic for receiving acoustic sensor data from the acoustic sensor 104. The onboarding component 114 is configured to provide secure connections between the acoustic sensor 104 and the gateway 110. The gateway 110, in accordance with the illustrative example, includes an acoustic data processing/compression component 116 that provides audio signal data compression, batching, storage, and transmission functionality for relaying acoustic data from the acoustic sensor 104 to a laundry machine acoustic data acquisition and processing platform 120. The acoustic data processing/compression component 116 carries out a store-and-forward role that includes converting received acoustic data into a compressed acoustic data batch for local storage in an acoustic data storage until the acoustic data batch is ready for transmission to the laundry machine acoustic data acquisition and processing platform 120.

The laundry machine acoustic data acquisition and processing platform 120, located remotely from the laundry machine 102 and operated as a cloud service in an illustrative example, incorporates a suite of acoustic data receiving and processing components that support later-performed machine learning-based analysis of acoustic sensor data provided by the acoustic sensor 104 for the laundry machine 102. The platform 120 includes an IoT edge device communication interface 122 that manages secure, encrypted connections during communications with the IoT interfaces supported by the laundry machine 102 (described herein above). In that regard, the IoT edge device communication interface 122 manages encryption keys and metadata required to provide secure connections to the laundry machine 102 (and all laundry machines registered with the system described herein).

An acoustic data message input queue 124 operates as a receiver component for audio data messages generated by the acoustic sensor 104 of the laundry machine 102. In the illustrative example, the received messages are received and temporarily stored, in the order of receipt, in an input queue. By way of example, and not limitation, a single received message stored in the queue 124 contains batched and compressed audio data from the acoustic sensor 104. However, alternative intake and temporary message storage arrangements are contemplated.

An acoustic data processing component 126 is configured to retrieve messages from the queue 124, combine and organize the message data into larger acoustic data batches, and forward the combined messages in a single package to a laundry machine acoustic data machine learning-based acoustic data analysis and reporting platform 130 (machine learning platform 130). The acoustic data processing component 126 accesses a laundry machine registration data 127 to associate received acoustic data messages with particular registered laundry machines (such as the laundry machine 102 in the illustrative example provided in FIG. 1. Additionally, the laundry machine registration data 127 includes identification information relating to the acoustic sensor 104, the machine communication interface 106. Such identification information facilitates correlating received data from particular laundry machines/devices with stored audio data and analytical output rendered by the machine learning platform 130.

A processed acoustic data storage 128 is a repository for long-term storage of the received acoustic data from the acoustic sensors of identified laundry machines (e.g., laundry machine 102).

An acoustic data application services 129 is a suite of services that leverage the data of the disclosed system (including analytical output rendered by the machine learning platform 130) to provide predictive remote preventative and remedial maintenance functionality and operational functionality. The details (service examples) of the acoustic data application services 129 are described herein below with reference to FIG. 3.

The machine learning platform 130 carries out the functions of training a plurality of laundry machine operational status machine learning models (discussed herein below) and executing such machine learning models to render operational status output with regard to the laundry machine 102 based upon the processed acoustic data provided by the acoustic sensor 104. The machine learning platform 130 is configured to enable training and executing machine learning models, based upon acoustic sensor data input, for rendering actionable predictive maintenance warnings, instructions and commands (for carrying out automated remedial actions including, for example, issuing job tickets as well as direct commands to the laundry machine 102 to avoid further damage or avoid damage altogether to either the laundry machine 102 or surrounding area such as damage from flooding). The machine learning platform 130 supports ongoing training of the models to improve output based upon observed actual statuses of the machine 102—in contrast to a status rendered by the currently trained learning model.

An acoustic data pre-processing component 132 converts retrieved acoustic data and renders the data in a form usable by a set of machine learning models 134. A machine learning data communications services 136 are a data exchange interface supporting requests by external services to request scores, metrics and indicators rendered by the machine learning models 134, including providing feedback for training (initial and update) the machine learning models 134. The machine learning models 134, described further herein below with reference to FIG. 5, constitute the analytical core of a predictive failure detection and maintenance arrangement that renders a current operational status of a component and/or functional feature of the laundry machine 102 based upon previously provided training examples (acoustic signal signatures for identified operational statuses). In summary, the machine learning models 134 incorporate tunable (through training) decision analytics, configured and trained by inputs (acoustic data sets) and corresponding verified output states. The machine learning models 134 receive acoustic data from the acoustic sensor 104 and the trained/tuned analytics render corresponding machine learning scores, metrics and indicators for performing predictive maintenance on the laundry machine 102.

Figure 2:
FIG. 2 is a schematic functional block diagram of the acoustic sensor in accordance with the disclosure.

Turning to FIG. 2, additional details are provided for an illustrative example of the acoustic sensor 104. In the illustrative example, the acoustic sensor 104 includes a network transceiver 202 that transmits acoustic data from the acoustic sensor 104 to the gateway 110 via a wireless network connection over 802.11 and/or 802.15.4 network protocols, depending on the version of the acoustic sensor 104. An acoustic sensor processor 204 is configured to perform digital signal processing, compression, and audio data transmission. The processor 204 also manages the communication connections of the acoustic sensor 104. The acoustic sensor 104 comprises, in an illustrative example, an external microphone 206 (mounted outside the laundry machine 102) and (at least one) an internal microphone 208 mounted at a location to sense sounds originating from the laundry machine 102 to capture acoustic data during operation of the laundry machine 102 indicative of a current physical/operational status of the laundry machine 102 (and components thereof). By way of example, the internal microphone 208 is incorporated into a sound isolation assembly. The sound isolation assembly is mounted to a metal outer panel of the laundry machine 102 (a good conductor of sound originating from within the laundry machine 102). The internal microphone 208 is housed within a sound cone (facing the metal outer panel of the laundry machine 102) surrounded by sound absorbing foam. The internal microphone 208 is physically configured/positioned to primarily capture sounds arising from operation of the laundry machine 102. The external microphone 206 senses ambient/environmental sound (including sound generated by other machines) that is used, for example by the processor 204, to extract an external noise components from the sound recording rendered by the internal microphone 208.

In some embodiments, the acoustic sensor 104 is installed on the laundry machine 102 during manufacture. Additionally, or alternatively, in some embodiments, the acoustic sensor 104 is installed on the laundry machine 102 during an onsite retrofitting process. In operation, the acoustic sensor 104 renders of digital record of sound waves generated by the machine 102 and, in conjunction with other networked acoustic data processing components described herein, processes the digital record of sound wave to determine whether the recording of the received sound waves indicates a current or a future failure of functions and/or components of the laundry machine 102.

Figure 3:
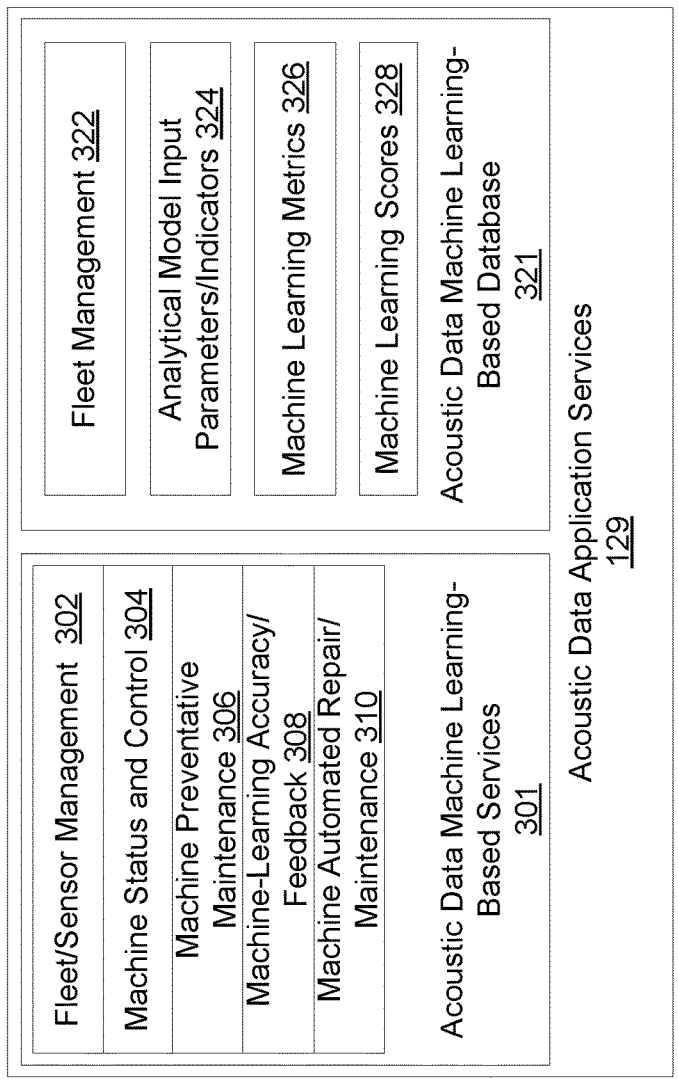
FIG. 3 is a schematic functional block diagram for an illustrative example of the acoustic data application services in accordance with the disclosure.

Turning to FIG. 3, additional details are provided for an illustrative example of the acoustic data application services 129. In the illustrative example, the acoustic data application services 129 include a combination of an acoustic data machine learning-based services 301 and an acoustic data machine learning-based database 321.

In the illustrative example, the machine learning-based services 301 include a combination of diverse services covering all aspects of machine learning-based determination of laundry machine operational state based upon acoustic sensor data. A fleet/sensor management service 302 maintains records regarding all laundry machines (e.g. laundry machine 102) including: physical location, repair manual, warranty information, and associated predictive maintenance hardware such as the acoustic sensor 104 discussed, by way of example, herein above. A machine status and control service 304 is configured to issue instructions and commands for remotely controlling laundry machines (e.g. laundry machine 102), and to gather laundry machine status information indicative of a state of the laundry machine (past and current).

A machine preventative maintenance service 306 is an interface to information relating to current and historic operational status of the laundry machines (e.g. laundry machine 102)—including machine status and maintenance instructions/commands arising from operation of the machine learning platform 130 on provided acoustic sensor data from the laundry machine 102. Such information includes: compiled machine status reports; detailed predictive maintenance required due to detected wear and tear, improper use, and incorrect installation or site conditions. The machine preventive maintenance service 306 is also configured to provide a operational status scoring and predictive maintenance required at the part and component level of the laundry machine 102. An overall operational status score may also be rendered. The machine preventative maintenance service 306 also provides trends, graphs, action plans, and recommended repair schedules and routes to mitigate issues before failure of the laundry machine 102.

A machine learning accuracy/feedback service 308 provides a feedback mechanism for confirming accuracy and correcting (re-training machine learning analytics) for inaccurate determinations rendered by the machine learning platform 130. Such feedback may relate to, for example, accuracy of the predictive model by providing repairs done, parts worn or damaged, and condition information discovered by on-site technicians. The accuracy/feedback service 308 provides an interface for informing relevant machine learning models regarding their accuracy to determine types of failures and become more refined. Refinement of the machine learning models includes for a given machine learning model: improving precision in identifying a true-positive, reducing false-positives, and more accurate in determining a specific component, sub-component, and component part requiring maintenance or replacement.

A machine automated repair/maintenance service 310 incorporates algorithms and status/control mechanisms to resolve detected errors automatically through commands issued directly to the laundry machine 102—without human intervention. As such, the machine automated repair/maintenance service 310 provides safety mechanisms to ensure that critical errors are promptly addressed (or not ignored), and that operational and user safety is accounted for during automatic error resolution by reading real-time machine status and control information.

With continued reference to FIG. 3, the acoustic data machine learning-based database 321 includes information facilitating operation of the acoustic data machine learning-based services 301 to provide predictive maintenance information and operations. A fleet management component 322 maintains information for managing installation and operation of the predictive maintenance capabilities, including information about the laundry machines (e.g. laundry machine 102), laundry sites (e.g. laundry site 100), acoustic sensors (e.g. acoustic sensor 104), machine status and control, machine interface boards (e.g. machine interface board 106), and other associated information.

An analytical model input parameters/indicators 324 stores predictive maintenance (PdM) indicators that are high level aggregated operational status information at the laundry machine 102 and component level that include historic information, actionable insights on failures and predicted failures, and suggested component repairs and replacements.

A machine learning metrics 326 stores machine learning metrics that are individual washer or dryer cycle-level metrics on the operational status of the laundry machine 102 and related components and functions during each cycle.

A machine learning scores 328 stores machine learning scores that are, for example, second-by-second scores related to the operational status of the laundry machine 102 and related components and functions.

Figure 4:
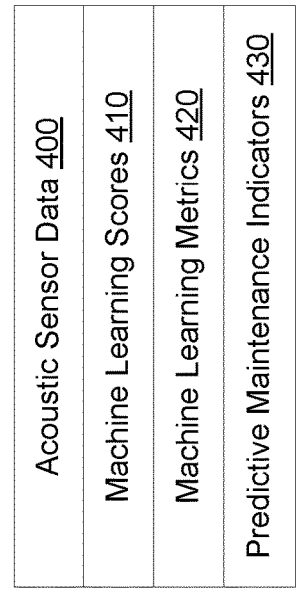
FIG. 4 is an exemplary set of data generated and maintained by the system in accordance with the disclosure.

Turning now to FIG. 4, a summary is provided of the types of information acquired, generated and maintained by the above-described system. An acoustic data 400 corresponds to the basic information acquired by the acoustic sensor 104 and forms the basis for the machine learning model training and execution described herein. The audio data gathered by the acoustic sensor 104 includes a spectrum of sound frequencies from 25 to 10,000 Hz, compressed into 32-bit amplitude measurements, recorded once per second. Specific sound frequencies recorded are, for example, (in Hz): 25, 31.5, 40, 50, 63, 80, 100, 125, 160, 200, 250, 315, 400, 500, 630, 800, 1000, 1250, 1600, 2000, 2500, 3100, 4000, 5000, 6300, 8000, 10000. By way of example, acoustic data is batched into data records/files containing many seconds to minutes of data. As noted above, the batched acoustic data is thereafter sent across a wireless connection (using either the Thread protocol 802.15.4 or over Wi-Fi 802.11) to the laundry machine acoustic data acquisition and processing platform 120 for further processing by the acoustic data processing component 126 that combines the received acoustic data batches into larger chunks (all from the same acoustic sensor 104) suitable for consumption and analysis by the machine learning models 134 of the machine learning platform 130.

A machine learning scores 410 contains a finest grained level of operational status scoring information, created every second by the machine learning models 134, each of which evaluates current deviation from normal based on the current operating function (cycle) of the laundry machine 102. By way of example, each model of the machine learning models provides a score from 0 to 100 for a specific machine function. The plurality of models of the machine learning models 134 operate simultaneously upon an input acoustic signal data set provided by the acoustic sensor during operation of the laundry machine 102.

A machine learning metrics 420 contains individual laundry machine cycle-level metrics on the operational status of the laundry machine 102 and related components and functions during each cycle run by the laundry machine 102. The machine learning metrics 420 are based on additional machine learning modeling and algorithms on top of the machine learning scores 410, to understand the significance and weighting of the various machine learning models over the period of an individual cycle. The result is a two-dimensional matrix of machine learning metrics (operational status from 0-100 and operational status High/Medium/Low) where one axis of the matrix is machine function and the other axis is machine component and/or error condition. Additionally, an overall operational status score is calculated for the cycle in total, again reported from 0-100 and High/Medium/Low.

The following is an example listing of machine learning metrics parameters for a machine cycle of the laundry machine 102:
    device id—Acoustic Sensor ID
    load start time—timestamp
    duration—in minutes
    duration operational status—0 to 100
    operational status composite—0 to 100
    overall operational status—High/Medium/Low
    motor assembly fill rinse operational status metric ranking—High/Medium/Low
    motor assembly fill rinse operational status metric value—0 to 100
    motor assembly agitate operational status metric ranking—High/Medium/Low motor assembly agitate operational status metric value—0 to 100 motor assembly final extract operational status metric ranking—High/Medium/Low motor assembly final extract operational status metric value—0 to 100 motor assembly drain operational status metric ranking—High/Medium/Low motor assembly drain operational status metric value—0 to 100 water supply fill rinse operational status metric ranking—High/Medium/Low water supply fill rinse operational status metric value—0 to 100 water supply supply chemicals entering operational status metric ranking—High/Medium/Low water supply supply chemicals entering operational status metric value—0 to 100 drain mechanism final extract operational status metric ranking—High/Medium/Low drain mechanism final extract operational status metric value—0 to 100 drain mechanism drain operational status metric ranking—High/Medium/Low drain mechanism drain operational status metric value—0 to 100 door lock door movement operational status metric ranking—High/Medium/Low door lock door movement operational status metric value—0 to 100

A predictive maintenance indicators 430 contains predictive maintenance indicators that are high level aggregated operational status information at the laundry machine (e.g. laundry machine 102) and component level that inform the system of a potential maintenance issue. Predictive maintenance (PdM) indicators are built using the machine learning metrics 420 and engineered data dimensions that quantify important data characteristics such as distribution, variability, and trend. Calculating long-term status of a predictive maintenance indicator value contemplates the following: current values of the machine learning-based metrics rendered by the machine learning platform 130; historical trend of the machine learning metric values (e.g. consistency, slope); a short-term acceleration or deceleration of the machine learning metric value; and a relationship between machine learning metric values.

By way of illustrative example, the predictive maintenance indicators 430 are assigned scores ranging from 0-100 and assigned a Low/Medium/High rating, where a Low rating means there is a low likelihood that maintenance is required, and a High rating means there is a high likelihood that maintenance is required. PdM Indicators are distinct by Laundry Machine classification. Different machine types may have different PdM Indicators. PdM Indicators identify the likelihood of a specific condition with the washing machine.

The following are example automatically detected error/warning conditions for a top load washing machine type for evaluating a current operational operational status status of a laundry machine via application of a combination of thresholds and decision logic to model-based PdM indicator scores: Over Suds, Not Level, Belt damaged, Loose spring, Motor bearing damage, Out of Balance, Slow Fill, and Blocked Drain.

The following is an example of a predictive maintenance indicator record for a machine for a given time period for washing a load of laundry:

device id—Acoustic Sensor ID
time period start—timestamp
time period end—timestamp
duration—in minutes
motor assembly operational status score—0 to 100
motor assembly operational status ranking—High/Medium/Low
drain operational status score—0 to 100
drain operational status ranking—High/Medium/Low
water supply operational status score—0 to 100
water supply operational status ranking—High/Medium/Low
overall operational status score—0 to 100
overall operational status ranking—High/Medium/Low
unlevel condition operational status score—0 to 100
unlevel condition operational status ranking—High/Medium/Low
out of balance condition operational status score—0 to 100
out of balance condition operational status ranking—High/Medium/Low
oversuds condition operational status score—0 to 100
oversuds condition operational status ranking—High/Medium/Low
operational status composite—0 to 100
overall operational status—High/Medium/Low
repair condition—[belt, drain clog, etc.]

Figure 5:
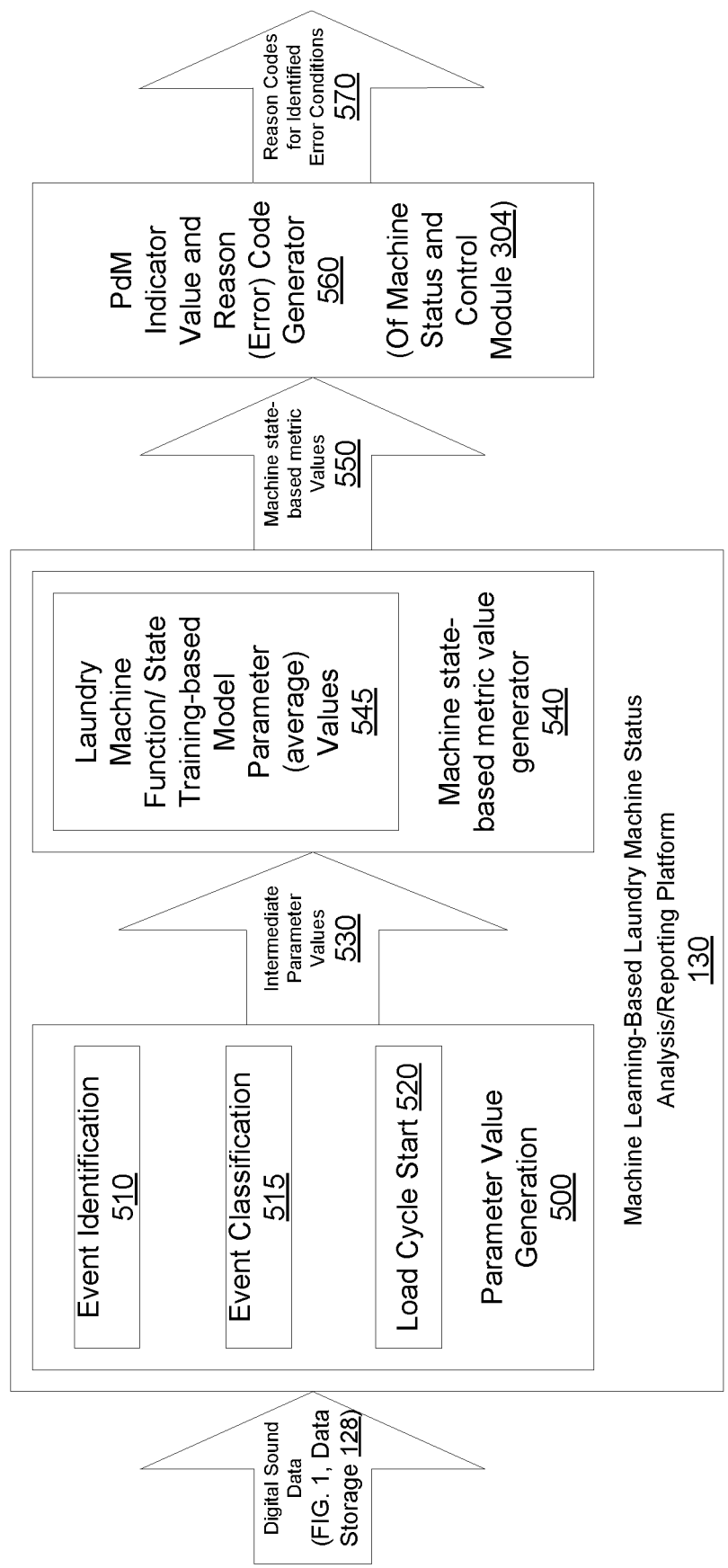
FIG. 5 is a schematic functional block diagram for an illustrative example of a machine learning-based laundry machine status analysis and reporting platform in accordance with the disclosure.

Turning now to FIG. 5, an illustrative example is provided of a particular implementation of using a machine learning-based modeling arrangement to identify particular types of laundry machine problems. In the illustrative implementation, a plurality of models are trained to: (1) identify particular sound signatures corresponding to normal functions performed by a particular laundry machine type and model; (2) identify particular failure mode sound signatures; and (3) provide an expected percentage of a laundry load processing period at which the particular sound signatures should be present (see Table 1 and Table 2 provided herein below). Additionally, a set of event classification models are trained to identify a sequence of events (sub-periods) within a complete laundry load processing period. Furthermore, a set of cycle start time models are trained for identifying the start of each one of a set of cycles making up the complete laundry load processing period. While the discussion herein is directed to processing a digital sound data set for a single laundry load processing period, the processing described herein can be performed on any number of laundry load processing periods for a same identified laundry machine. By processing sound data for multiple laundry loads, improved statistical accuracy may be achieved.

In accordance with the current disclosure, the illustrative machine-learning based model arrangement includes, as noted previously with reference to FIG. 1, the machine learning-based laundry machine status analysis/reporting platform (machine learning platform) 130. The machine learning platform, once trained by processing digital sound data generated during operation of a particular type and model of laundry machine (in both normal and failure operating modes), receives a digital sound data set from, for example, the data storage 128. The digital sound data set is generated from sound recorded by a particular identified laundry machine during a full load processing period performed by the identified laundry machine that is of the particular laundry machine type and model for which training was previously performed. The machine learning platform 130 applies the previously trained models (described further herein below) to the received digital sound data set to render a set of state-based metric values 550 (see Table 1 provided herein below) representing a current operational state of the identified laundry machine based upon the received and processed digital sound data set.

With continued reference to FIG. 5, the machine learning platform 130 includes a parameter value generation module 500 that renders a set of intermediate parameter values, rendered by applying trained models to the received digital sound data, for further processing by a laundry machine state-based metric value generator 540 to render the state-based metric values 550. In the illustrative implementation, an event identification module 510 applies, to the received digital sound data, trained sound signature models for each one of the identified normal laundry functions listed in Table 1 and failure modes identified in Table 2 to render, for each normal function or failure mode listed in Table 1 and Table 2, a percentage of laundry machine operating time the particular function/mode was acoustically sensed during the laundry machine load processing period. The percentages are determined, for example, by dividing a count of sensed occurrences of the normal function or failure mode by the total count of processed sound samples of the received digital sound data for the laundry load period. The particular modeling and analytic techniques used to identify the particular function/mode present in a given digital sound sample can be any of a variety of known sound type identification techniques, as are currently known at present—as well as any future developed analytical techniques.

TABLE 1

Normal Function

| | |
|---|---|
| hot_cold | 0.17032 |
| spin_spray | 0.04911 |
| fill_no_water_level | 0.12330 |
| fill_w_water_level | 0.08362 |
| drain_off | 0.51879 |
| drain_on | 0.43509 |
| supply_off | 0.18394 |
| supply_on | 0.74723 |
| drum_on (motor) | 0.76769 |
| drum_off (motor) | 0.18611 |
| drum_rev (motor) | 0.32817 |
| drum_fwd (motor) | 0.44234 |
| Agitate | 0.32629 |
| final_spin | 0.14964 |
| drum_on_drain_off | 0.43432 |
| drum_on_drain_on | 0.33175 |
| water_on_drum_on | 0.04972 |
| water_off_drum_on | 0.71923 |

TABLE 2

Failure

| | |
|---|---|
| agitate_failure | 0.01000 |
| final_spin_failure | 0.01000 |
| drum_on_failure | 0.01000 |

An event classification module 515 applies a trained classification model to the received digital sound data to identify particular points in the laundry load processing period when the laundry machine transitions to a particular operational state of a sequence of states (see e.g., Table 3 herein below) for a laundry load processing period.

TABLE 3

| | |
|---|---|
| Fill | 0 |
| Agitate | 1 |

TABLE 3-continued

| | |
|---|---|
| None | 2 |
| Spin | 3 |
| Spin/Spray | 4 |
| Spin | 5 |
| None | 6 |
| Spin | 7 |
| Spin/Spray | 8 |
| Spin | 9 |
| Spin/Spray | 10 |
| Spin | 11 |
| None | 12 |
| Final Spin | 13 |

A load cycle start module 520, similar to the event classification module 515, applies a trained classification model to the received digital sound data to identify particular points in the laundry load processing period when the laundry machine transitions to a particular cycle of a sequence of cycles (e.g., fill, agitate, spin, etc.) for a laundry load processing period.

With continued reference to FIG. 5, the laundry machine state-based metric value generator 540 applies a function/state training-based model (see Table 1 above, right side values for each modeled event identification) to the compiled (percentage) values for each type of identifiable event for a laundry load period (or multiple ones of such periods) received from the parameter value generation module 500, to render the machine state-based metric values 550 (representing a degree to which the observed percentages differ from the modeled percentages). By way of example, the metric values 550 are statistically generated values rendered by non-linear probabilistic functions and scaled to an absolute maximum (e.g. 100), and where a difference of zero from the model-based average results in a minimum (e.g. 0) value.

The output metric values 550 are provided to a PdM indicator value and reason code generator 560. By way of example, the PdM indicator value and reason code generator 560 is incorporated into the machine status and control module 304 of FIG. 3 described herein above. Initially, the PdM indicator value and reason code generator 560 renders a PdM value for each PdM indicator type identified in the header of Table 4 provided herein below. By way of example, an implementation of the generator 560 renders an overall PdM indicator value for a particular one of the set of PdM indicator types by averaging values of received metric values in accordance with the metric-to-PdM indicator type mapping set forth herein below in Table 4. For example, the PdM motor indicator value is rendered as an average of the metric values of the metric values 550 for "spin_spray", "drum_on", "agitate", "final spin", "drum_on_drain_off", "agitate_failure" and "drum_on_failure". In the case of sensing a machine function directly corresponding to a machine malfunction (i.e., sounds corresponding to a sensed "x_failure"), the existence of the sound itself may operate as an absolute indication of a failed component/operation that sufficient, alone, to render a "reason code" (indication of attention needed to maintain/repair the laundry machine 102). Such "failure" modes contrast with the "normal" machine functions for which a deviation from an expected value is determined and scored in accordance with illustrative examples provided herein.

TABLE 4

| Machine Function | Component PdM | | | | | Function PdM | |
|---|---|---|---|---|---|---|---|
| | PDM Motor | PDM Water | PDM Drain | PDM Agitate | PDM Spin | Final Extract PDM | PDM Fill |
| hot_cold | | X | | | | | X |
| spin_spray | X | | | | X | | |
| fill_no_water_level | | | | | | | |
| fill_w_water_level | | X | | | | | X |
| drain_off | | | | | | | |
| drain_on | | | | X | | X | |
| supply_off | | | | | | | |
| supply_on | | | | | | | |
| drum_on | X | | | X | | | |
| drum_off | | | | | | | |
| drum_rev | | | | | | | |
| drum_fwd | | | | | | | |
| agitate | X | | | X | | | |
| final_spin | X | | | | X | | |
| drum_on_drain_off | X | | X | | | | |
| drum_on_drain_on | | | X | | | X | |
| water_on_drum_on | | X | | | | X | |
| water_off_drum_on | | | | | | | |
| agitate_failure | X | | | X | | | |
| final_spin_failure | | | | | | | |
| drum_on_failure | X | | | X | | | |

Additionally, the reason code aspect of the generator 560 applies a set of error-state-specific PdM indicator-based rules to the previously generated PdM indicator type-specific values to identify whether the laundry machine was operating in any error state corresponding to one of the indicator-based rules. The results of such processing are a set of reason codes 570 for particular ones of errors determined to be present by applying the set of error-state-specific PdM indicator-based rules to the previously rendered PdM indicator values for the supported PdM indicator types. By way of example, in accordance with an implementation, the reason code generator portion of the generator 560 incorporates a PdM indicator-based rule for each of the error states set forth in Table 5 (herein below).

TABLE 5

Blocked Drain
Slow Fill
Belt Damage
Loose Spring Mechanism
Motor Bearing Damage
Unlevel Machine
Out of Balance
Oversuds Additionally, a specific example for a rule definition for determining whether an "out of balance" error is indicated by the processed digital sound data for a laundry load (or multiple loads) is provided below in Table 6. In accordance with an illustrative, non-limiting, example, an out of balance error state exists when each of the specified PdM and function failure conditions—inequalities in the illustrative example—are met. It is expressly noted that the form of the rule can vary in accordance with various implementations of the described error determination system described herein.

TABLE 6

"Out of Balance" Error Rule Set

| PDM Motor | >40 | OUT OF |
| PDM Water | >40 | BALANCE |
| PDM Drain | <30 | |
| PDM Agitate | >67 | |
| PDM Spin | >78 | |
| PDM Final Extract | <35 | |
| PFM Fill | >33 | |
| Function: Final Spin failure | >.456 | |
| Function: Agitate Failure | >.856 | |

Figure 6:
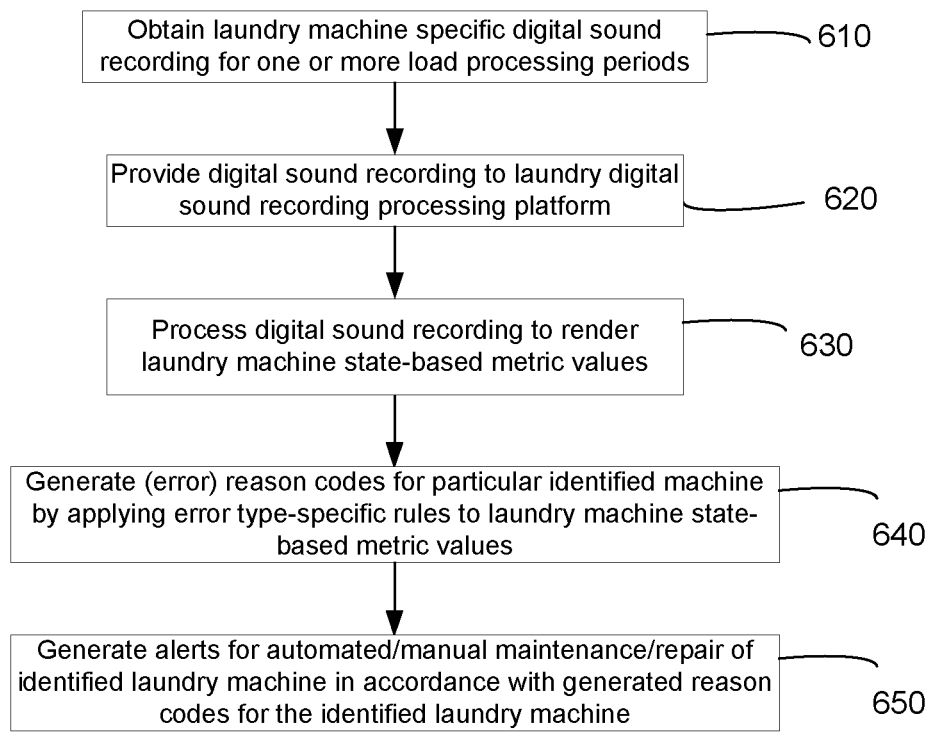
FIG. 6 is a flowchart summarizing a set of operations performed while predicting a maintenance issue using a plurality of machine learning models and acoustic data in accordance with the disclosure.

Turning now to FIG. 6, a flowchart summarizes an exemplary set of operations, carried out by the system summarized in FIGS. 1-5, for determining (through statistical predictive modeling) the existence of a maintenance issue (associated with/corresponding to a reason code) in accordance with illustrative examples of the current disclosure. During 610, for the laundry machine 102 with an attached acoustic sensor 104, a digital audio recording is rendered for a laundry load washing sequence (from start to finish). The acquired digital audio recording is packaged (potentially with other recordings obtained during other laundry load washing sequences) and provided, during 620, to the laundry machine acoustic data acquisition and processing platform 120 where it is further processed and batched before storing in the data storage 128.

Thereafter, during 630, the machine learning platform 130 receives and processes the previously processed and stored sound data for a particular identified laundry machine (potentially for multiple loads) to render a set of machine state-based metric values by comparing observed sound sample data to a set of modeled data (e.g., averages) for particular types of identifiable sound events (see Table 1 above).

Thereafter, during 640, reason codes 570 are generated in accordance with, for example, the operation of the PdM indicator value and reason code generator 560 discussed herein above with reference to FIG. 5.

Thereafter, during 650, the resulting/stored reason codes are accessed/received by the acoustic data application services 129 where the reason codes for a particular identified laundry machine are analyzed (including statistical—e.g. trending—analysis) and determined to warrant generating/issuing an alert message. Such alert messages include both commands for automated execution of a remedial operation that is transmitted, for execution, by the identified laundry machine. Alternatively, a job ticket (conveyed, by email, text message, etc.) is issued for handling by maintenance personnel at a site of the identified laundry machine.

Additionally, the various reason codes are accumulated and processed as a group, by the acoustic data application services 129, to render visualized machine operational status trends in a variety of ways, including mapping machines and commercial laundry sites by operational status, searching and sorting machines and sites by all varieties of operational status metrics, viewing the history of operational status for a machine along with its service history, and comparing machines operational status and commercial laundry site aggregate operational status to others.

A Dispatcher user uses this operational status information, operational status history, and predicted maintenance alerts to inform their scheduling of Service Technicians. Higher severity operational status issues warrant faster response times, but more commonly maintenance predictions are made with enough advanced warning that they can be schedule and batched for efficiency.

Various processes carried out and facilitated by the acoustic data application services 129 (described above with reference to FIG. 3) are provided/summarized in the flowcharts of FIGS. 7-10 described herein below. Turning to FIG. 7, a flowchart summarizes operations performed in association with carrying out a repair/maintenance task in accordance with a laundry machine status determination rendered by machine learning models in accordance with the disclosure. During 710, one or more new reason codes are generated by the machine status and control 304. During 720, in accordance with the update, a determination is made whether an identified laundry machine associated with the new reason code(s) exhibits a status, in view of the new reason codes and previously received reason codes, requiring remedial attention. If remedial action is needed, then control passes to 730 wherein an alert message is issued to invoke further redial action (either automated or human action) with respect to the identified reason code(s) and identified laundry machine. Control passes to 740 wherein the machine status and control 304 updates the data store 128 to include the new reason code(s). If the new reason code(s) do not change the status of the laundry machine with regard to performing a further (previously unspecified) action, then control passes directly from 720 to 740.

Continuing with the discussion of FIG. 7, during 750 the machine status and control 304 determines whether the overall operational status, based upon a potential plurality of current and past received reason codes is in a state of severely degraded operation. If such severe degradation is established, then control passes to 760 where the acoustic data machine learning-based services 301 cooperatively operate to issue an immediate service call to address the severe machine degradation. In cases where operation is not severely degraded, control passes from 750 to 770 where a request is issued to schedule a service call.

Regardless of whether the degradation is determined to be severe, when the acoustic data application services 129 predict maintenance is required on a laundry machine, the operational status of various laundry machine components are determined, from whole assemblies down to the individual parts.

Service technicians can further use the acoustic data application services 129 to view detailed service history, operational status predictions by components, and cycle by cycle operational status information to better focus their maintenance efforts and diagnose a root cause of the problem. Once the repair or maintenance is performed the service technician provides feedback via the acoustic data application services 129 noting the parts and processes used in the maintenance or repair.

While not shown in FIG. 7, a further operation may be carried out upon completion of an indicated repair/maintenance procedure to update the machine learning models 134 by performing a re-training of the models based upon confirmatory and/or contradictory information provided by service technician feedback to improve failure and maintenance predictions by retraining scenarios or in some cases creating entirely new machine learning models for new scenarios based on areas of known poor modeling accuracy.

Turning to FIG. 8, a flowchart summarizes an exemplary set of steps for generating a laundry machine operational status using a combination of machine interface board data and acoustic sensor data provided from the laundry machine 102. When the laundry machine 102 runs there are two primary streams of information that are used to predict needed maintenance. The first is provided by the acoustic sensor 104 that records/transduces the sounds produced by operation of the laundry machine 102 during operation resulting in generated reason codes (rendered and stored during 810) when operational status deviates by an unacceptable degree from an expected state. The second information is provided by the machine interface board 106 (received during 820) that gives information about machine state, including errors and user cycle selection information. During 830 the machine status and control 304 integrates data from the two distinct sources to provide enhanced confidence and precision with respect to issuance of alerts and commands/requests for remedial actions to be carried out with response to an associated identified laundry machine. As such, during 830, the acoustic data application services 129 combine the first and second streams of information to provide an enhanced view of the machine operational status, component operational status, current state, and historic information pertinent to each machine and to the entire laundry site. This combined view is presented to the user with more accuracy than either data source alone could provide.

While not shown expressly in FIG. 8, the effect of the operation of the system in accordance with the combination of operations set forth in FIGS. 7 and 8 is that the machine learning models facilitate the system rendering alerts for remedial actions with respect to a particular laundry machine based upon an error status detected by the machine learning-based decision making processes that went undetected by sensing circuitry associated with error detection/messaging supported by control circuitry and the machine interface board of the laundry machine 102. The acoustic sensor can in some situations recognize unsafe conditions when the machine itself does not recognize the problem. When one of these situations is encountered the acoustic data application services 129, if needed, triggers a stop condition via the remote machine interface board or kill power via a smart plug to stop the laundry machine 102 to prevent (further) damage to the machine, contents thereof, and the surrounding vicinity.

Turning to FIG. 9 a flowchart summarizes operations for improving/enhancing route calculations based upon predictive maintenance output rendered by the machine learning platform 130 during 910. Thereafter, during 920, each service technician is provided an optimized service route for the day, considering parts needed, maintenance time needed per site, and site addresses and predicted drive times. Routes are optimized to take care of as many machines per visit as possible.

The acoustic data application services 129 use component operational status and predictive maintenance data to optimize maintenance services. By predicting required parts, and service procedures/required time, as well as prioritizing a set of laundry machines and sites for maximum uptime, the acoustic data application services 129 plan service technician routes for several days to weeks in advance. The acoustic data application services 129 determines whether a given number of service technicians is sufficient to service a set of laundry machines and sites and provide alerts to dispatchers ahead of time that more service technicians need to be scheduled to prevent predicted outages.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein known to the inventors for carrying out the invention. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system comprising:
    an interface configured to receive signal data corresponding to a signal rendered by a sensor of a sensed component of a laundry machine during operation of the laundry machine; and
    a machine learning-based processing system configured to render a status indicator that is indicative of a status of the laundry machine, the processing system comprising a processor and a non-transitory computer readable medium including computer-executable instructions that, when executed by the processor, facilitate carrying out a method comprising:
        receiving the signal data corresponding to the signal rendered by the sensor of the sensed component of the laundry machine;
        rendering parameter values indicative of the status of the laundry machine by applying machine learning models to the signal data;
        determining, by applying a set of conditions to a set of predictive maintenance indicators derived from the parameter values, a status indicator value corresponding to a degraded operational status of the laundry machine; and
        issuing, in accordance with the determining, an electronic maintenance alert relating to a remedial operation for the laundry machine,
    wherein the sensor is an acoustic sensor, and wherein the machine learning models define acoustic signatures for corresponding normal functions performed by the laundry machine, and
    wherein the machine learning models define a percentage of a total operational time for processing a laundry load by the laundry machine where an identified normal function is acoustically sensed and identifiable using a corresponding acoustic signature of the machine learning models.

2. The system of claim 1 wherein the rendering is performed upon an acoustic signal sample set acquired over a period corresponding to the processing the laundry load by the laundry machine.

3. The system of claim 1 wherein the machine learning models define acoustic signatures for corresponding failure modes of operation for the laundry machine.

4. The system of claim 1 wherein the status indicator relates to operation of a motor.

5. The system of claim 1 wherein the status indicator relates to operation of a tub filling operation.

6. The system of claim 1 wherein the status indicator relates to a tub draining operation.

7. The system of claim 1 wherein status indicator relates to a spin operation.

8. The system of claim 1 wherein the signal data includes digital sound data corresponding to at least two separate transduced sound signals obtained simultaneously by two distinct microphones, wherein a first microphone is configured to sense sound generated by the laundry machine, and wherein a second microphone is configured to sense ambient sound originating external to the laundry machine.

9. A method carried out by a system comprising:
    an acoustic sensor data interface; and
    a machine learning-based processing system;
    wherein the method comprises:
        receiving, by the acoustic sensor data interface, digital acoustic signal data corresponding to sensed sound received by an acoustic sensor from components of a laundry machine during operation of the laundry machine, wherein the acoustic sensor includes at least a microphone configured to render a transduced electronic signal of sound waves sensed by the microphone during operation of the laundry machine; and
        rendering, by the machine learning-based processing system, a reason code indicative of a current operational status of the laundry machine,
    wherein the processing system comprises a processor and a non-transitory computer readable medium including computer-executable instructions that, when executed by the processor, facilitate carrying out a method during the rendering that comprises:
        receiving an acoustic data set rendered from the transduced electronic signal;
        rendering a functional metric parameter values indicative of an operational status of the laundry machine by applying machine learning models to the acoustic data set;
        identifying, by applying a set of conditions to a set of predictive maintenance indicators derived from the functional metric parameter values, a reason code corresponding to a degraded operational status of the laundry machine; and
        issuing, in accordance with the identifying, an electronic maintenance alert relating to a remedial operation for the laundry machine, wherein the machine learning models define acoustic signatures for corresponding normal functions performed by the laundry machine, and wherein the machine learning models define a percentage of a total operational time for processing a laundry load by the laundry machine where an identified normal function is acoustically sensed and identifiable using a corresponding acoustic signature of the machine learning models.

10. The method of claim 9 wherein the rendering is performed upon an acoustic signal sample set acquired over a period corresponding to the processing the laundry load by the laundry machine.

11. The method of claim 9 wherein the machine learning models define acoustic signatures for corresponding failure modes of operation for the laundry machine.

12. The method of claim 9 wherein the reason code relates to operation of a motor.

13. The method of claim 9 wherein the reason code relates to operation of a tub filling operation.

14. The method of claim 9 wherein the reason code relates to a tub draining operation.

15. The method of claim 9 wherein the reason code relates to a spin operation.

16. The method of claim 9 wherein the acoustic data set includes digital sound data corresponding to at least two separate transduced sound signals obtained simultaneously by two distinct microphones, wherein a first microphone is configured to sense sound generated by the laundry machine, and wherein a second microphone is configured to sense ambient sound originating external to the laundry machine.

\* \* \* \* \*